United States Patent [19]

Hirtz et al.

[11] Patent Number: 5,943,101
[45] Date of Patent: Aug. 24, 1999

[54] METHOD AND CIRCUIT ARRANGEMENT FOR DISTINGUISHING BETWEEN STANDARD AND NON-STANDARD CVBS SIGNALS

[75] Inventors: Gangolf Hirtz, Niedereschach; Thomas Hollmann; Michael Maier, both of Villingen-Schwenningen, all of Germany

[73] Assignee: Deutsche Thomson-Erandt GmbH, Villingen-Schwenningen, Germany

[21] Appl. No.: 08/847,029

[22] Filed: May 1, 1997

[30] Foreign Application Priority Data

May 8, 1996 [DE] Germany .......................... 196 18 350

[51] Int. Cl.$^6$ ................................................. H04N 5/46
[52] U.S. Cl. ........................................ 348/604; 348/558
[58] Field of Search ................................... 348/558, 604, 348/194, 555, 553, 180, 501, 525

[56] References Cited

U.S. PATENT DOCUMENTS

| | | | |
|---|---|---|---|
| 4,860,089 | 8/1989 | Smith | 348/194 |
| 4,860,090 | 8/1989 | Murata et al. | 348/604 |
| 4,985,757 | 1/1991 | Yasuki et al. | 348/604 |
| 5,111,160 | 5/1992 | Hershberger | 348/558 |
| 5,192,997 | 3/1993 | Imbert et al. | 348/558 |

FOREIGN PATENT DOCUMENTS

| | | | |
|---|---|---|---|
| 4024228 | 2/1991 | Germany | H04N 11/22 |
| 4423214 | 8/1995 | Germany | H04N 7/01 |

*Primary Examiner*—Victor R. Kostak
*Attorney, Agent, or Firm*—Joseph S. Tripoli; Peter M. Emanuel; Kuniyuki Akiyama

[57] ABSTRACT

For many signal processing arrangements in TV receivers it is necessary to know the type of signal source. A plurality of parameters must be set depending on whether a standard-conforming source and hence a standard signal or a non-standard source (for example VCR) is involved. The circuit according to the invention is capable of making a statement in a TV receiver as to whether or not a source corresponding to the TV standard is present. For this purpose, the locking of the color subcarrier with the horizontal frequency is investigated and two different criteria (FSCFH, CCC) are utilized for the decision. The optimized setting of parameters in the receiver is possible with the aid of the decision made. Furthermore, the circuit provides, in the event of a standard signal, a highly stable sampling clock (fLL1) of the kind necessary, for example, for ColorPlus processing within the PALplus system.

8 Claims, 4 Drawing Sheets

METHOD AND CIRCUIT ARRANGEMENT FOR DISTINGUISHING BETWEEN STANDARD AND NON-STANDARD CVBS SIGNALS

The invention relates to a method and circuit arrangement for distinguishing between standard and non-standard CVBS signals.

1. Prior Art

For many methods of signal processing in TV receivers, it is necessary to know the type of signal source. A plurality of parameters must be set depending on whether a standard-conforming source and hence a standard signal or a non-standard source is involved.

Figure 1:
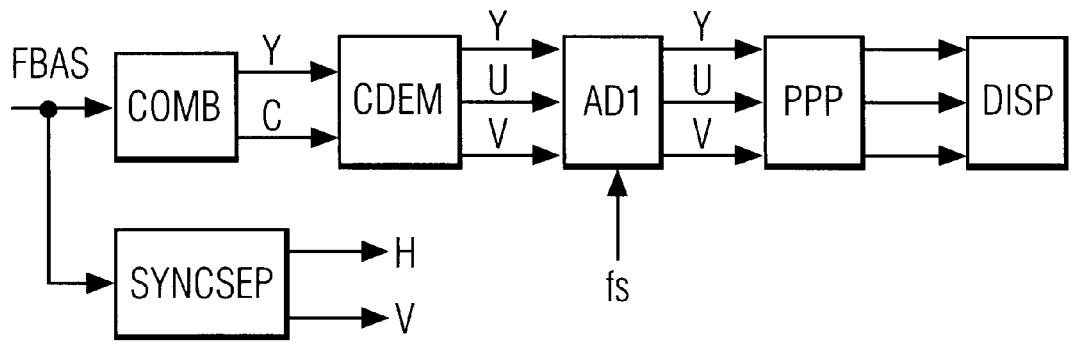

FIG. 1 shows the typical structure of a TV receiver. The time constant in the sync signal separation SYNCSEP should be switched as a function of the source. For example if the source is a home video recorder, so that a non-standard signal is present, then rapid settling of the PLL is necessary in order to be able to follow the sudden phase changes in the VCR signal. If a standard-conforming signal without any sudden phase changes is involved, a slow time constant is advantageous, since it renders the obtaining of the sync signals insensitive to noise. Furthermore, a comb filter comB which may be present should be disconnected as soon as a video recorder is present at the input, since the comb filter function is ensured only with a standard-conforming signal. The same applies to ColourPlus processing, which yields accurate separation between luminance and chrominance within a PALplus transmission system. This processing also presupposes a standard-conforming signal and must be disconnected as soon as, for example, a video recorder signal is present.

These considerations show that identification of non-standard-conforming input signals is necessary. In particular, it is also necessary to identify a source change in both directions, that is to say standard to non-standard signal and vice versa.

2. Invention

The invention is based on the object of specifying a method and circuit arrangement for distinguishing between standard and non-standard CVBS signals. This object is achieved by means of the method specified in claim 1.

The invention is based on the further object of specifying a circuit arrangement for applying the method according to the invention. This object is achieved by means of the circuit arrangement specified in claim 6.

For PAL and NTSC systems, the following relationships represent the correlation between the horizontal frequency $f_H$ and the colour subcarrier frequency $f_{SC}$:

$$f_{SC} = \left(\frac{1135}{4} + \frac{1}{615}\right) f_H \quad \text{for PAL systems}$$

$$f_{SC} = \frac{455}{2} f_H \quad \text{for NTSC systems}$$

In other words, there is a fixed relationship between the colour subcarrier frequency and the horizontal frequency. Furthermore, in a sampling system having a line-locked sampling rate $f_S$, there is a fixed number of pixels per line. If a system according to CCIR 601 (sampling clock 13.5 MHz) is taken as a basis, then this number is 864 pixels per line for a PAL system ($f_S = 864\ f_H$) and 858 pixels per line for an NTSC system ($f_S = 858\ f_H$). As a result, the sampling frequency and the colour subcarrier frequency are also fixedly coupled to one another.

$$\frac{f_{SC}}{f_S} = \frac{672 + \frac{10064}{16875}}{2048} \quad \text{for PAL systems}$$

$$\frac{f_{SC}}{f_S} = \frac{35}{132} \quad \text{for NTSC systems}$$

This correlation is the basis for identification of non-standard signals. A signal which does not maintain this mathematical relationship is regarded as a non-standard signal.

A further property is revealed when the phase relationship of the colour subcarrier in successive fields is considered. In the following context, the consideration will be undertaken for 50 Hz PAL systems. The same principle can also be applied to NTSC systems.

From one line of a first field to a line 312 lines away in the second field, the colour subcarrier experiences a phase shift of approximately 180°. If, for example, the colour subcarrier in line 59 and that in line 371 are added, then they cancel out. If the colour subcarrier which has been obtained from the CVBS signal by a colour subcarrier PLL is sampled with a line-locked clock, then it is cancelled out only when the input signal has standard-conforming coupling between the colour subcarrier frequency and the horizontal frequency. This behaviour can also be used to distinguish between standard and non-standard signals.

In principle, therefore, the inventive method for distinguishing between standard and non-standard CVBS signals consists in using one or more distinguishing criteria which are based on a coupling of the colour subcarrier frequency with the horizontal frequency.

In this case, it is advantageous to apply different distinguishing criteria depending on whether a standard or a non-standard CVBS signal is assumed.

When a non-standard signal is assumed, it is possible, preferably, after addition of the colour subcarriers of successive fields, to investigate whether the sum of the colour subcarriers is less than a specific threshold value.

When a standard signal is assumed, it is possible, preferably, to generate a first horizontal signal, making use of the coupling of the horizontal frequency and the colour subcarrier frequency, and to separate a second horizontal signal from the CVBS signal and check whether the two horizontal signals are stable with respect to one another.

Furthermore, by utilizing the locking of the colour subcarrier frequency and the horizontal frequency in standard signals, a highly stable, line-locked sampling clock can be produced.

In principle, the inventive circuit arrangement for distinguishing between standard and non-standard CVBS signals consists in applying one or more distinguishing criteria, which are based on a coupling of the colour subcarrier frequency with the horizontal frequency, in an evaluation logic unit.

It is advantageous in this case that, for the identification of a non-standard signal, a first horizontal signal is generated from the television signal by means of a control loop, making use of the coupling of the horizontal frequency and the colour subcarrier frequency, and a second horizontal signal is generated from the television signal using a separation circuit, and the two signals are compared in an evaluation logic unit.

For the identification of a standard signal, provision is preferably made of an analog-to-digital converter for sampling the colour subcarrier, a memory for storing a test signal, an adder for the addition of the stored test signal and of the test signal of a line of a later field, an absolute value former for forming the absolute value of the aggregate signal, an integrator for cumulation of the absolute values and a threshold value logic unit for comparing the cumulated value with a predetermined threshold value.

DRAWINGS

Figure 2:
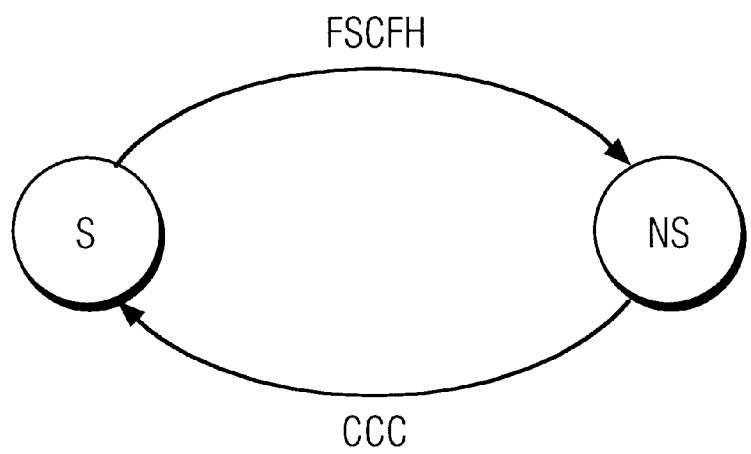
Figure 3:
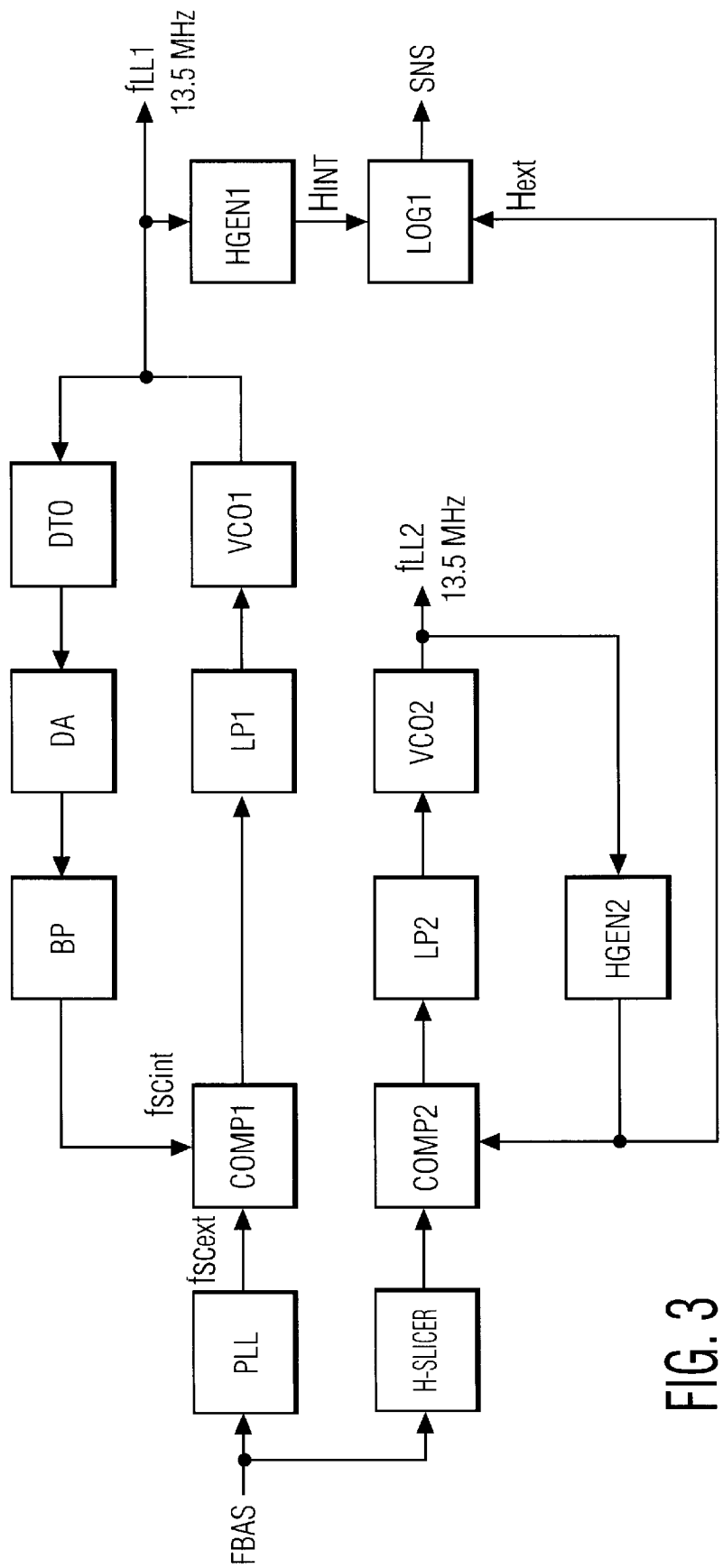
Figure 4A:
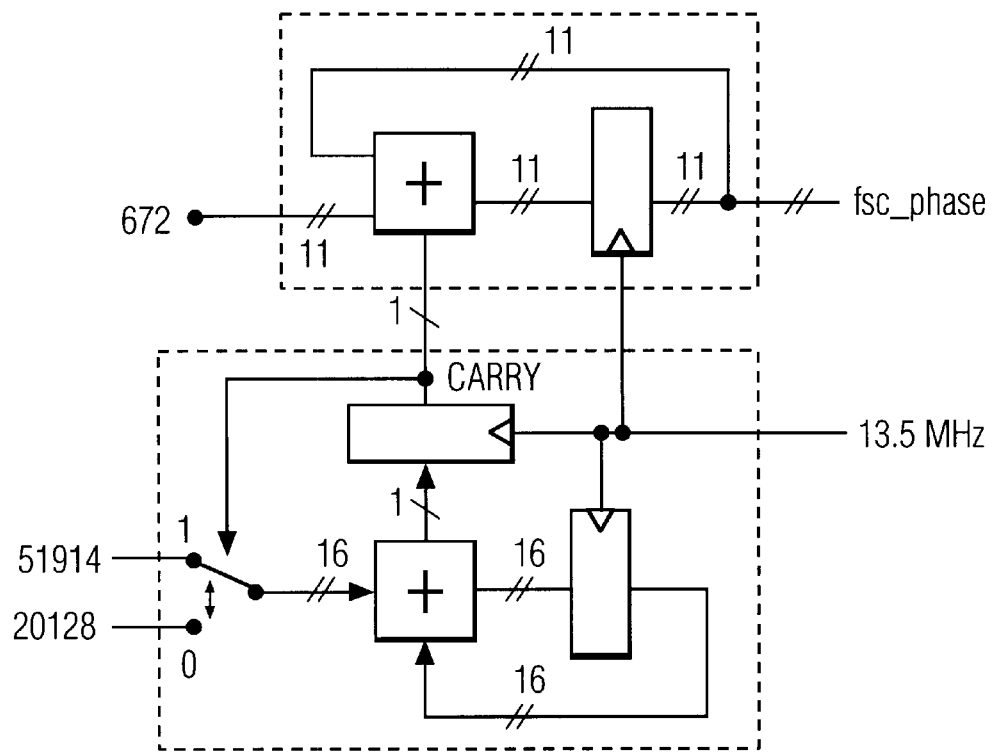
Figure 4B:
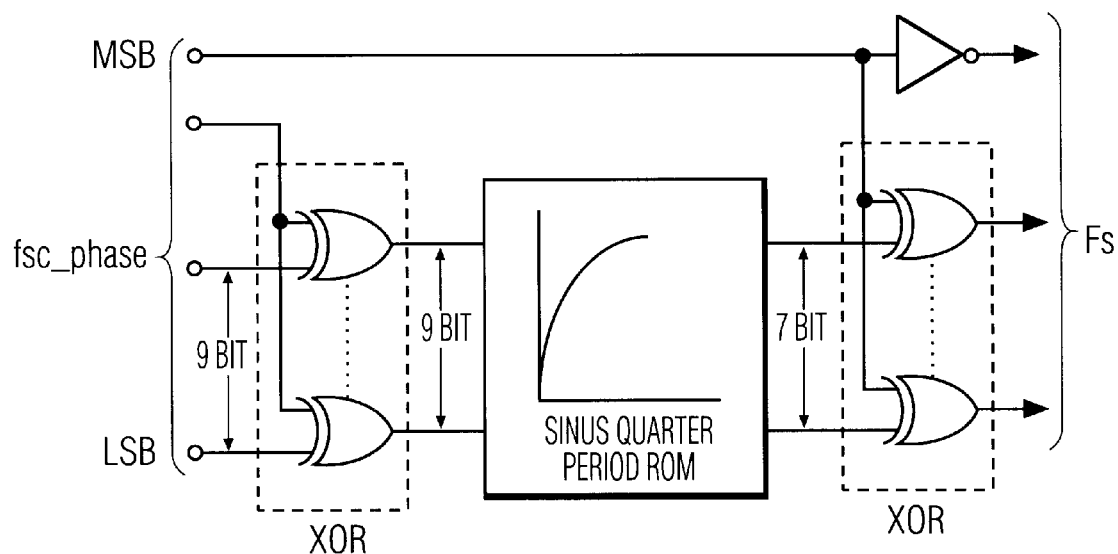
Figure 5:
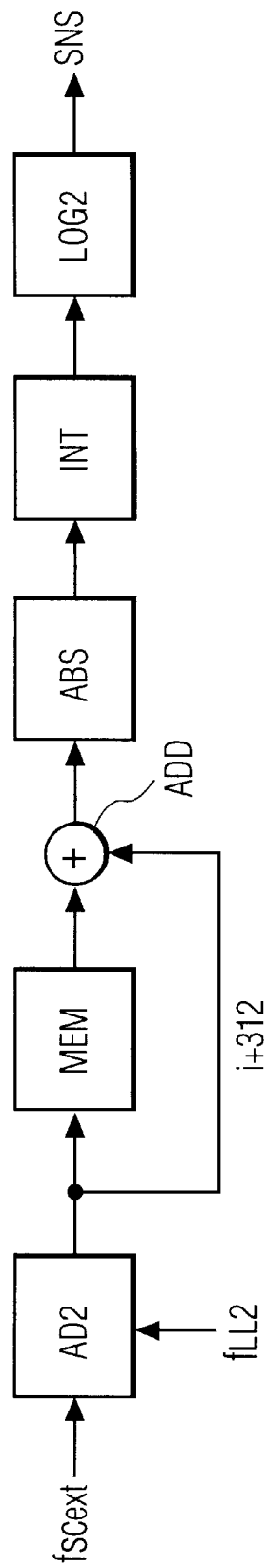

Exemplary embodiments of the invention are described with reference to the drawings, in which:

FIG. 1 shows the receiver-end processing of the signals present in the TV receiver, FIG. 2 shows a decision diagram with a changeover between standard and non-standard signals, FIG. 3 shows an inventive arrangement for identifying non-standard sources, FIG. 4A and 4B show an arrangement for colour subcarrier generation, FIG. 5 shows an arrangement for investigating colour subcarrier cancellation.

EXEMPLARY EMBODIMENTS

FIG. 2 shows the state diagram for the decision standard signal S or non-standard signal NS. If the current decision is "S", that is to say a standard signal is assumed, then an investigation is carried out to see whether there is a fixed coupling FSCFH between $f_{SC}$ and $f_H$. If this is not the case, the decision is made that a non-standard signal NS is involved. If it has been decided that a non-standard signal is instantaneously present, the colour subcarrier cancellation CCC from one field to the next is investigated. If the colour subcarrier cancels out, a standard signal at the input of the detector is involved.

FIG. 3 shows the entire system for identifying standard and non-standard signals. For the identification of a non-standard signal, the colour subcarrier fscext is recovered from the television signal CVBS by means of a chrominance PLL CPLL. This is always possible with high stability, even with noisy signals, since a crystal PLL is used for this purpose. Even with video recorders, the colour subcarrier is stable since it is generated with crystal stability in the recorder. The aim of the following circuit is to generate a horizontal signal, making use of the coupling of the horizontal frequency and the colour subcarrier frequency.

The oscillator VCO1 (Voltage Controlled Oscillator) yields a clock of 13.5 MHz. This clock is used to clock a DTO (Discrete Time Oscillator). The latter generates samples of the colour subcarrier while taking account of the mathematical, theoretical correlation between the line-locked sampling frequency and the colour subcarrier. The circuit illustrated in FIG. 4 is used for this purpose (see BBC Report 2/1986 C. Clarke: "Colour encoding and decoding techniques for line-locked sampled PAL and NTSC television signals"). The upper section supplies the phase of a respective sample while the lower section, using a ROM, supplies the correct amplitude value for the phase. If the output value of the DTO is converted from digital form to analog form with the aid of a digital-to-analog converter DA and post-filtered with a bandpass filter BP, whose centre frequency is the colour subcarrier frequency fsc, then an analog colour subcarrier is produced. A comparison between the digitally generated colour subcarrier and the colour subcarrier obtained from the input signal by means of the colour subcarrier PLL takes place in a phase comparator COMP1. The control loop is closed by a loop filter. The effect achieved by this control loop is that the externally generated colour subcarrier $f_{SCext}$ is in phase with the internal colour subcarrier $f_{SCint}$. The clock signal of VCO1 can now be divided by 864 in order to obtain an H-frequency signal $H_{int}$.

At the same time, a horizontal pulse is obtained from the incoming CVBS signal using a standard separation circuit, which horizontal pulse follows the H pulse of the incoming signal. A slicer with downstream PLL (including VCO2) supplies this H pulse. A line-locked clock $f_{LL2}$ of 13.5 MHz is also available. For a standard signal which maintains with mathematic exactness the correlation between the colour subcarrier frequency and the horizontal frequency, the internally generated horizontal pulse $H_{int}$ and the external pulse $H_{ext}$ obtained by H separation are stable relative to one another. These two signals are investigated for stability in an evaluation logic unit. If they drift relative to one another, then it is decided that a non-standard signal is involved. The clock $f_{LL1}$ cannot then be used as line-locked sampling clock for A/D conversion, since it also drifts relative to the line raster.

As long as a standard signal is present, $f_{LL1}$ represents a highly stable clock since it is obtained indirectly from a crystal oscillator, the colour subcarrier crystal oscillator. This clock is therefore highly suitable, for example, as a sampling clock in a PALplus system. With the ColourPlus method, this system provides a possible way of accurately separating luminance and chrominance. However, a highly stable clock is necessary for this.

The clock $f_{LL2}$ serves, then, as a sampling clock during the detection of a non-standard signal. It is not as stable as $f_{LL1}$ since it has not been derived from the colour subcarrier. However, $f_{LL2}$ is always line-locked, even in the event of non-standard signals. If the colour subcarrier $f_{SCext}$ is then sampled using this clock, it is possible to investigate this signal to see whether the colour subcarrier cancels out from one line of the first field to the corresponding line of the second field. The corresponding circuit is illustrated in FIG. 5.

The colour subcarrier is sampled by the analog-to-digital converter AD using $f_{LL2}$ and a test signal thereof is stored in a memory MEM. The test signal may involve parts of a line. The larger the test signal is, the more sensitive the detection is. During the next field, to be precise exactly 312 lines later, the stored test signal and the test signal of the line of the incoming field are added with the aid of an adder ADD. The absolute value is formed from the result of the summation in ABS and this absolute value is cumulated for the duration of the test signal with the aid of an integrator INT. A check is then made in a threshold value logic unit LOG2 to see whether the result falls below a predetermined threshold value for the duration of a plurality of pictures. If this is the case, then it is assumed that a standard signal is involved. In response, the above-described non-standard detection is again put into operation and the line-locked sampling clock based on the colour subcarrier is obtained.

In order then to detect the change to a non-standard signal again, the corresponding, above-described investigation of the $f_H/f_{SC}$ locking must be utilized again. Furthermore, if the cancellation of the colour subcarrier were used as a criterion, it would not be possible to identify a non-standard signal since the line-locked sampling clock has been derived from the colour subcarrier and, therefore, the criterion of cancellation between the fields is always met.

The invention can be utilized, for example, for devices for receiving PALplus signals, such as television sets, video recorders or multimedia devices, and alternatively for devices for receiving colour television signals according to a further development of other colour television systems such as, for example, NTSC.

We claim:

1. Method for distinguishing between standard and non-standard CVBS signals wherein one or more distinguishing criteria which are based on a coupling of the color subcarrier frequency with the horizontal frequency are employed, and wherein different distinguishing criteria are applied depending on whether a standard or a non-standard CVBS signal is assumed; said method comprising the steps of:

assuming a signal is a non-standard CVBS signal;

adding the color subcarriers of successive fields; and determining whether the sum of the color subcarriers is less than a specific value.

2. Circuit for distinguishing between standard and non-standard CVBS signals comprising:

an evaluation logic unit for applying one or more distinguishing criteria which are based on a coupling of the color subcarrier frequency with the horizontal frequency; and for the identification of a non-standard signal;

a control loop for generating a first horizontal signal from a CVBS signal making use of the coupling of the horizontal frequency and the color subcarrier frequency; and a separation circuit for generating a second horizontal signal from the CVBS signal;

said evaluation logic unit comparing the first and second horizontal signals; and for the identification of a standard signal, said circuit further comprising:

an analog-to-digital converter for sampling the color subcarrier, a memory for storing a test signal, an adder for the addition of the stored test signal and of a test signal of a line of a later field, an absolute value former for forming the absolute value of the aggregate signal, an integrator for cumulation of the absolute values; said evaluation logic unit comparing the cumulated value with a predetermined threshold value.

3. A method of distinguishing between standard and non-standard CVBS signals, comprising the steps of:

investigating if a fixed coupling exists between a frequency of a color subcarrier and a horizontal frequency of the CVBS signal when assuming the CVBS signal is a standard signal; and determining the CVBS signal is a non-standard signal when a fixed coupling does not exist.

4. The method of claim 3, further comprising the steps of:

adding color subcarriers of successive fields of the CVBS signal when assuming the CVBS signal is a non-standard signal;

determining if a sum of the added color subcarriers is less than a predetermined threshold value.

5. The method of claim 3, further comprising the steps of:

generating a first horizontal signal using the coupling between the horizontal frequency and color subcarrier frequency;

separating a second horizontal signal from the CVBS signal; and determining if the first and second horizontal signals are stable with respect to each other.

6. The method of claim 3, further comprising the step of producing a highly stable, line-locked sampling clock utilizing a locking of the color subcarrier frequency and horizontal frequency upon determining the CVBS signal is a standard signal.

7. A circuit arrangement for distinguishing between standard and non-standard CVBS signals wherein at least one distinguishing criteria of the CVBS signal based on a coupling of a color subcarrier frequency with a horizontal frequency are applied to said circuit arrangement, said circuit arrangement comprising:

a control loop for generating a first horizontal signal by producing digital sample values of the color subcarrier signal being considered for coupling between the horizontal frequency and color subcarrier frequency;

a separation circuit for generating a second horizontal signal from the CVBS signal; and an evaluation logic unit for comparing said first and second horizontal signals to determine if said first and second horizontal signals are stable with respect to one another and deciding that the CVBS signal is a non-standard signal when said first and second horizontal signals drift relative to one another.

8. The circuit arrangement of claim 7, further comprising:

an analog-to-digital converter for sampling the color subcarrier;

a memory for storing a test signal;

an adder for adding the stored test signal and the test signal of a line of a later field;

an absolute value former for forming an absolute value of the added signal;

an integrator for cumulating the absolute values formed by said absolute value former; and a threshold value logic unit for comparing the cumulated value with a predetermined threshold value, wherein the CVBS signal is determined to be a standard signal when the cumulated value is below the threshold value for the duration of a plurality of pictures.

* * * * *